(12) United States Patent
Ohshita

(10) Patent No.: US 11,665,237 B2
(45) Date of Patent: May 30, 2023

(54) DATA MANAGEMENT SYSTEM AND NON-TRANSITORY COMPUTER READABLE MEDIUM STORING DATA MANAGEMENT PROGRAM

(71) Applicant: FUJIFILM BUSINESS INNOVATION CORP., Tokyo (JP)

(72) Inventor: Hiroshi Ohshita, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 473 days.

(21) Appl. No.: 16/839,283

(22) Filed: Apr. 3, 2020

(65) Prior Publication Data
US 2021/0152634 A1 May 20, 2021

(30) Foreign Application Priority Data
Nov. 15, 2019 (JP) .............................. JP2019-207166

(51) Int. Cl.
H04L 67/1097 (2022.01)
H04L 67/104 (2022.01)
G06F 16/93 (2019.01)

(52) U.S. Cl.
CPC .......... *H04L 67/1097* (2013.01); *G06F 16/93* (2019.01); *H04L 67/1044* (2013.01)

(58) Field of Classification Search
CPC .. H04L 67/1097; H04L 67/1044; G06F 16/93
See application file for complete search history.

(56) References Cited

U.S. PATENT DOCUMENTS

| | | | | |
|---|---|---|---|---|
| 2016/0216891 A1* | 7/2016 | Bester | ...................... | G06F 3/067 |
| 2017/0317927 A1* | 11/2017 | Kadle | ...................... | H04L 45/22 |
| 2021/0152634 A1* | 5/2021 | Ohshita | ................. | H04L 67/563 |

FOREIGN PATENT DOCUMENTS

| | | | | |
|---|---|---|---|---|
| EP | 1038368 B1 * | 7/2013 | ............. | G06F 16/13 |
| JP | 2015-14954 A | 1/2015 | | |
| JP | 2019-40327 A | 3/2019 | | |
| KR | 20200139528 A * | 12/2020 | | |
| RU | 2601162 C1 * | 10/2016 | | |

* cited by examiner

*Primary Examiner* — Shean Tokuta
(74) *Attorney, Agent, or Firm* — Oliff PLC (57) ABSTRACT

A data management system includes a first apparatus, a second apparatus, and a connecting device. The first apparatus is installed inside a network and is subjected to a restriction on connection from outside the network. The second apparatus is installed outside the network and is capable of connecting to the first apparatus and to a terminal outside the network. The connecting device is integrated with or separated from the first apparatus. The first apparatus and the second apparatus perform synchronization control to maintain consistency between data retained by the first apparatus and data retained by the second apparatus. In response to a connection request from a terminal inside the network, the connecting device selects one of the apparatuses as a connection destination for the terminal inside the network in accordance with a communication condition between the apparatuses and the separate operating conditions of each.

8 Claims, 8 Drawing Sheets

| DATA ID | REGISTRATION DATE AND TIME | FILENAME | AUTHORIZED USER | STORAGE LOCATION | ACCESS INFORMATION | PROCESSING STATE IN CLOUD |
|---|---|---|---|---|---|---|
| C0001 | 03/01/2018 | File01 | A | ON PREMISES | x x x x | — |
| C0002 | 03/02/2018 | File02 | A, B | BOTH | x x x x | IMAGE REDUCED (× 0.5) |
| C0003 | 03/03/2018 | File03 | A, B, C | BOTH | x x x x | ZIP COMPRESSION |
| ⋯ | ⋯ | ⋯ | ⋯ | ⋯ | ⋯ | ⋯ |

| USER ID | USERNAME | EMAIL ADDRESS | PASSWORD | GROUP MEMBERSHIP | REGISTRATION DATE AND TIME |
|---|---|---|---|---|---|
| U0001 | A | userA@yyy.co.jp | qwertyui | x x x | 03/01/2018 |
| U0002 | B | userB@yyy.co.jp | lkjhgfds | x x x | 03/01/2018 |
| U0003 | C | userC@yyy.co.jp | zxcvbnm | x x x | 03/02/2018 |
| ⋯ | ⋯ | ⋯ | ⋯ | ⋯ | ⋯ |

| ON-PREMISES CONDITION | CLOUD CONDITION | COMMUNICATION LOAD | CONNECTION DESTINATION |
|---|---|---|---|
| IN SERVICE | IN SERVICE | LOW | BOTH ACCESSIBLE |
| IN SERVICE | IN SERVICE | HIGH | ON PREMISES |
| IN SERVICE | OUT OF SERVICE | LOW | ON PREMISES |
| IN SERVICE | OUT OF SERVICE | HIGH | ON PREMISES |
| OUT OF SERVICE | IN SERVICE | LOW | CLOUD |
| OUT OF SERVICE | IN SERVICE | HIGH | UNDETERMINED |
| OUT OF SERVICE | OUT OF SERVICE | ANY LEVEL | INACCESSIBLE |

| USER/ MEMBERSHIP | CONNECTION DESTINATION |
|---|---|
| A | ON PREMISES |
| B | ON PREMISES |
| C | CLOUD |
| .... | .... |
| PERSONNEL DEPARTMENT | ON PREMISES |
| PURCHASE DEPARTMENT | CLOUD |
| R & D DEPARTMENT | ON PREMISES |
| .... | .... |

| DATA TYPE | INTENDED USE | PROCESSING | CONNECTION DESTINATION |
|---|---|---|---|
| DOCUMENT | EDIT | NONE | ON PREMISES |
| DOCUMENT | VIEWING | NONE | CLOUD |
| .... | .... | .... | .... |
| IMAGE | ACQUISITION, ANALYSIS | REDUCTION (REDUCE BY 25%) | CLOUD |
| IMAGE | VIEWING, PRINTING | REDUCTION (REDUCE BY 25%) | CLOUD |
| IMAGE | ACQUISITION, ANALYSIS | REDUCTION (REDUCE BY 75%) | ON PREMISES |
| IMAGE | VIEWING, PRINTING | REDUCTION (REDUCE BY 75%) | CLOUD |
| .... | .... | .... | .... |

| COMMUNICATION LOAD | SIZE AFTER DECOMPRESSION | CONNECTION DESTINATION |
|---|---|---|
| LOW | SMALL | CLOUD |
| LOW | LARGE | CLOUD |
| HIGH | SMALL | CLOUD |
| HIGH | LARGE | ON PREMISES |

DATA MANAGEMENT SYSTEM AND NON-TRANSITORY COMPUTER READABLE MEDIUM STORING DATA MANAGEMENT PROGRAM

CROSS-REFERENCE TO RELATED APPLICATIONS

This application is based on and claims priority under 35 USC 119 from Japanese Patent Application No. 2019-207166 filed Nov. 15, 2019.

BACKGROUND

(i) Technical Field

The present disclosure relates to a data management system and a non-transitory computer readable medium storing a data management program.

(ii) Related Art

Japanese Unexamined Patent Application Publication No. 2015-014954 discloses a data processing apparatus that is installed in an intranet and that synchronizes a first data retained by a data retaining unit in the intranet with a second data retained by an information processing apparatus included in a cloud system.

Japanese Unexamined Patent Application Publication No. 2019-040327 discloses a system that performs a workflow including a plurality of processes by allocating processes to an on-premises environment or to a cloud environment.

SUMMARY

A known data management system performs synchronization control to maintain consistency between data retained by a first apparatus installed inside a network and data retained by a second apparatus installed outside the network. If such a data management system receives a connection request from a terminal, one of the first apparatus and the second apparatus can be selected as a connection destination for this terminal. For example, it is expected that operations are performed in accordance with a basic policy in which a terminal inside the network is connected to the first apparatus and a terminal outside the network is connected to the second apparatus. However, if the connection destination for the terminal inside the network is fixed at the first apparatus, it is possible that a flexible operation that responds to a circumstance of the data management system is hampered.

Aspects of non-limiting embodiments of the present disclosure relate to performing an operation in accordance with a basic policy in which a terminal inside a network is connected to a first apparatus installed inside the network and a terminal outside the network is connected to a second apparatus installed outside the network and making the operation more adaptable to a circumstance than the operation in which the connection destination for a terminal inside the network is fixed at the first apparatus.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a data management system including a first apparatus, a second apparatus, and a connecting device. The first apparatus is installed inside a network and is subjected to a restriction on connection from outside the network. The second apparatus is installed outside the network and is capable of connecting to the first apparatus and to a terminal outside the network. The connecting device is integrated with or separated from the first apparatus. The first apparatus and the second apparatus perform synchronization control to maintain consistency between data retained by the first apparatus and data retained by the second apparatus. In response to a connection request from a terminal inside the network, the connecting device selects one of the first apparatus and the second apparatus as a connection destination for the terminal inside the network in accordance with a communication condition between the first apparatus and the second apparatus and operating conditions of the first apparatus and the second apparatus.

BRIEF DESCRIPTION OF THE DRAWINGS

An exemplary embodiment of the present disclosure will be described in detail based on the following figures, wherein.

DETAILED DESCRIPTION

An exemplary embodiment of a data management system according to the present disclosure will be described in relation to a data management program with reference to the attached drawings.

Configuration of Data Management System 10

Overall Configuration

Figure 1:
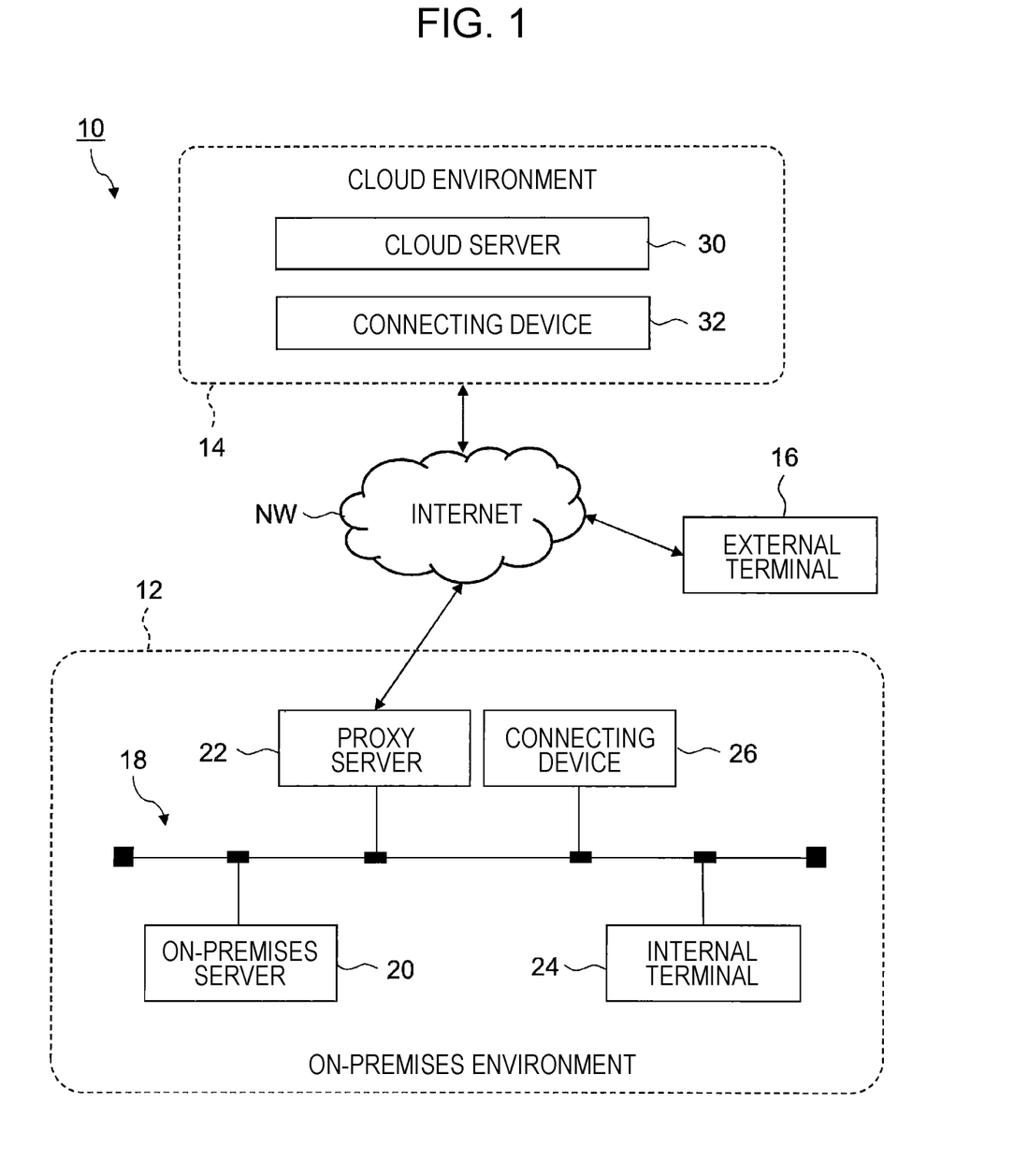
FIG. 1 depicts an overall configuration of a data management system according to an exemplary embodiment of the present disclosure.

FIG. 1 depicts an overall configuration of a data management system 10 according to the exemplary embodiment of the present disclosure. The data management system 10 is configured to be capable of providing a data management service of a so-called "hybrid type". A data management service of this type manages data both in an on-premises environment 12 and in a cloud environment 14. Data to be managed (hereinafter, also referred to as a "managed data item") may have various forms, such as document data, moving image data, still image data, and voice data.

The on-premises environment 12 is a network environment that restricts access so that unlimited access from the Internet NW is not permitted. In contrast, the cloud environment 14 is a network environment that permits access from unspecified users. In other words, while a client terminal outside the on-premises environment 12 (referred to as an external terminal 16 below) is permitted to directly access the cloud environment 14, direct access to inside the on-premises environment 12 is blocked.

An intranet 18, which corresponds to a "network", is constructed in the on-premises environment 12 as a private network in an organization. An on-premises server 20, which corresponds to a "first apparatus", a proxy server 22, a client terminal in the intranet 18 (referred to as an internal terminal 24 below), and a connecting device 26 are connected to the intranet 18.

The on-premises server 20 is a computer that performs supervising control regarding data management in the on-premises environment 12. Although the on-premises server 20 is illustrated as a single computer in this example, instead of a single computer, the on-premises server 20 may be a group of computers that form a distributed system.

The proxy server 22 represents various devices connected to the intranet 18 and communicates with external apparatuses including a cloud server 30. The proxy server 22 may have a firewall function to block illicit access from outside the on-premises environment 12.

The internal terminal 24 is a computer capable of bidirectionally communicating with external apparatuses and is constituted, for example, by a personal computer, a tablet, a smartphone, or a wearable device. The internal terminal 24 is configured to realize a user interface by combining an input function provided by an input unit and an output function provided by an output unit.

The connecting device 26 receives a connection request from the internal terminal 24, selects a connection destination suitable for the circumstance, and routes the connection. Although being separated from the on-premises server 20 in this example, the connecting device 26 may be integrated with the on-premises server 20 instead of being separated.

In the cloud environment 14, the cloud server 30, which corresponds to a "second apparatus", and a connecting device 32 are installed. The cloud server 30 is a computer that performs supervising control regarding data management in the cloud environment 14. Although the cloud server 30 is illustrated as a single computer in this example, instead of a single computer, the cloud server 30 may be a group of computers that form a distributed system.

The connecting device 32 receives a connection request from the external terminal 16 or the internal terminal 24, selects a connection destination suitable for the circumstance, and routes the connection. Although being separated from the cloud server 30 in this example, the connecting device 32 may be integrated with the cloud server 30 instead of being separated.

Configurations of On-Premises Server 20 and Cloud Server 30

Figure 2:
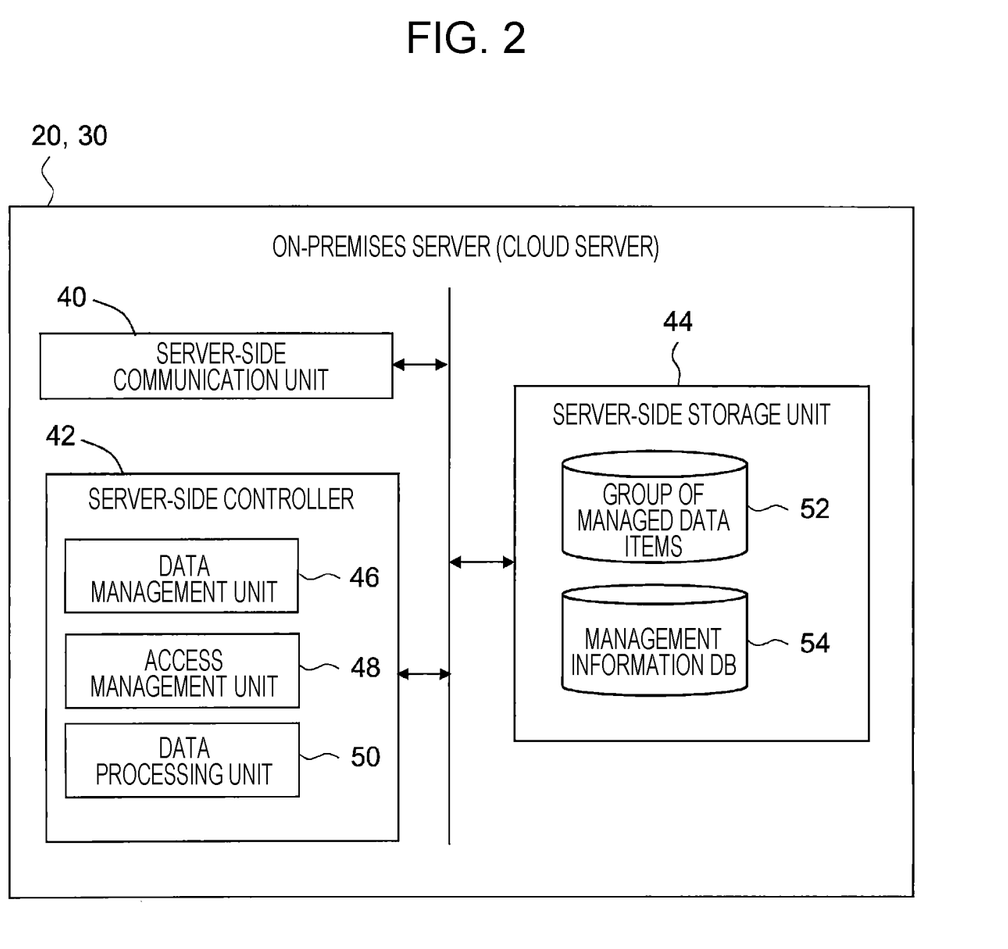
FIG. 2 is a block diagram of an on-premises server depicted in FIG. 1.

FIG. 2 is a block diagram of the on-premises server 20 depicted in FIG. 1. The on-premises server 20 has a configuration including a server-side communication unit 40, a server-side controller 42, and a server-side storage unit 44. The cloud server 30 also has the same basic configuration as is depicted in FIG. 2.

The server-side communication unit 40 is a communication interface to transmit and receive an electric signal to and from external apparatuses. This communication interface enables the on-premises server 20 to exchange various kinds of data items with the internal terminal 24 via the intranet 18 or with the cloud server 30 via the Internet NW.

The server-side controller 42 has a configuration with a processor including a central processing unit (CPU) and a graphics processing unit (GPU). The server-side controller 42 reads and executes a data management program stored in the server-side storage unit 44 and functions as a data management unit 46, an access management unit 48, and a data processing unit 50.

The server-side storage unit 44 is formed by a non-transitory computer readable storage medium. Examples of a computer readable storage medium include a storage device, such as a hard disk drive (HDD) or a solid state drive (SSD), and a portable medium, such as a magneto-optical disc, a read-only memory (ROM), a compact-disc read-only memory (CD-ROM), or a flash memory. In the example depicted in FIG. 2, a group of managed data items 52 is stored in the server-side storage unit 44, and a database regarding information about managed data items (referred to as a "management information database (DB) 54" below) is also constructed in the server-side storage unit 44.

Figure 3A:
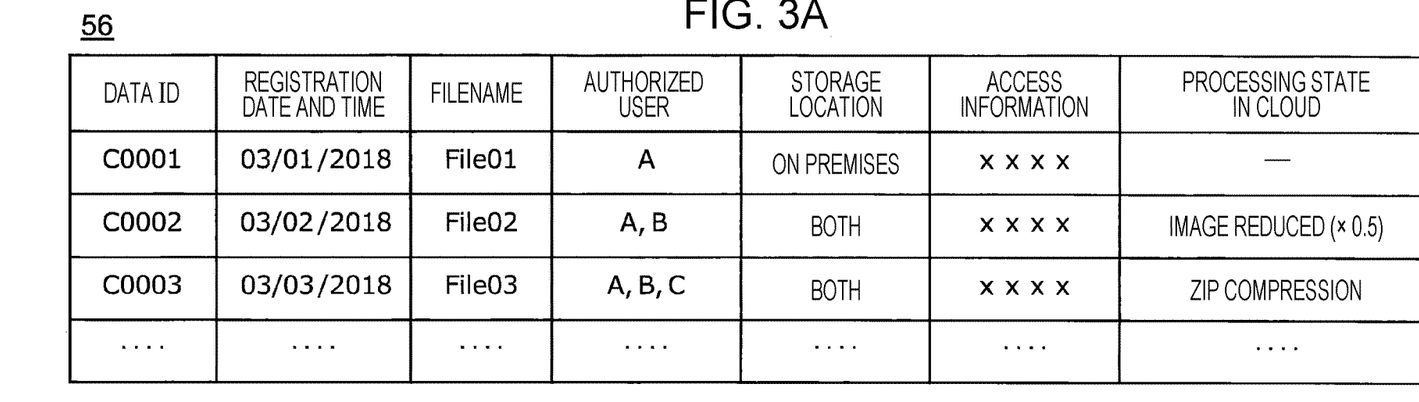
FIG. 3A is an illustration depicting an example data structure provided by a data management table included in a management information database (DB) depicted in FIG. 2.

FIG. 3A is an illustration depicting an example data structure provided by a first management table 56 included in the management information DB 54 depicted in FIG. 2. The first management table 56 provides information representing a relationship between the following items: "data ID", "registration date and time", "filename", "authorized user", "storage location", "access information", and "processing state in cloud". The item "data ID" is identification information to identify a managed data item. The item "registration date and time" represents the time point at which the managed data item is registered. The item "filename" represents the name of the managed data item. The item "authorized user" identifies the names of one or more users who are permitted to access the managed data item. The item "storage location" identifies the location where the managed data item is stored. The item "access information" represents the network information used by the on-premises server 20 to access the cloud server 30. The item "processing state in cloud" represents a processing state of the managed data item retained by the cloud server 30.

Specifically, for the item "storage location", one of the following three items is selected: (1) "on premises", which indicates that the managed data item is stored only in the on-premises server 20, (2) "cloud", which indicates that the managed data item is stored only in the cloud server 30, and (3) "both", which indicates that the managed data item is stored both in the on-premises server 20 and in the cloud server 30.

Figure 3B:
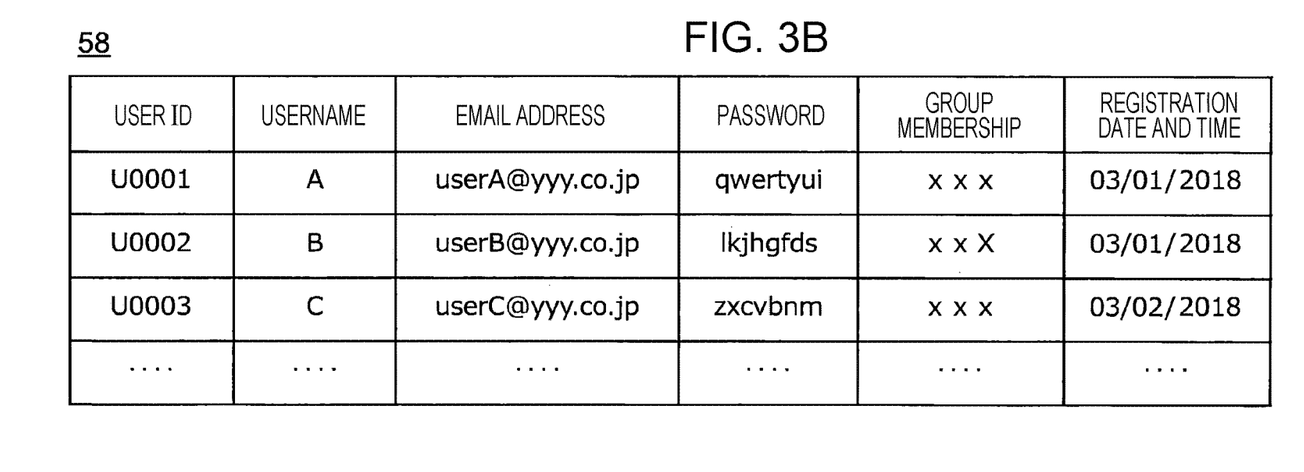
FIG. 3B is an illustration depicting an example data structure provided by a resource management table included in the management information DB depicted in FIG. 2.

FIG. 3B is an illustration depicting an example data structure provided by a second management table 58 included in the management information DB 54 depicted in FIG. 2. The second management table 58 provides information representing a relationship between the following items: "user ID", "username", "email address", "password", "group membership", and "registration date and time". The item "user ID" is identification information to identify a user. The item "username" represents the name of the user. The item "email address" represents the destination to which the managed data item is transmitted. The item "password" is used for user authentication. The item "group membership" represents the group to which the user belongs. The item "registration date and time" represents the time point at which the user is registered.

Configurations of Connecting Devices 26 and 32

Figure 4:
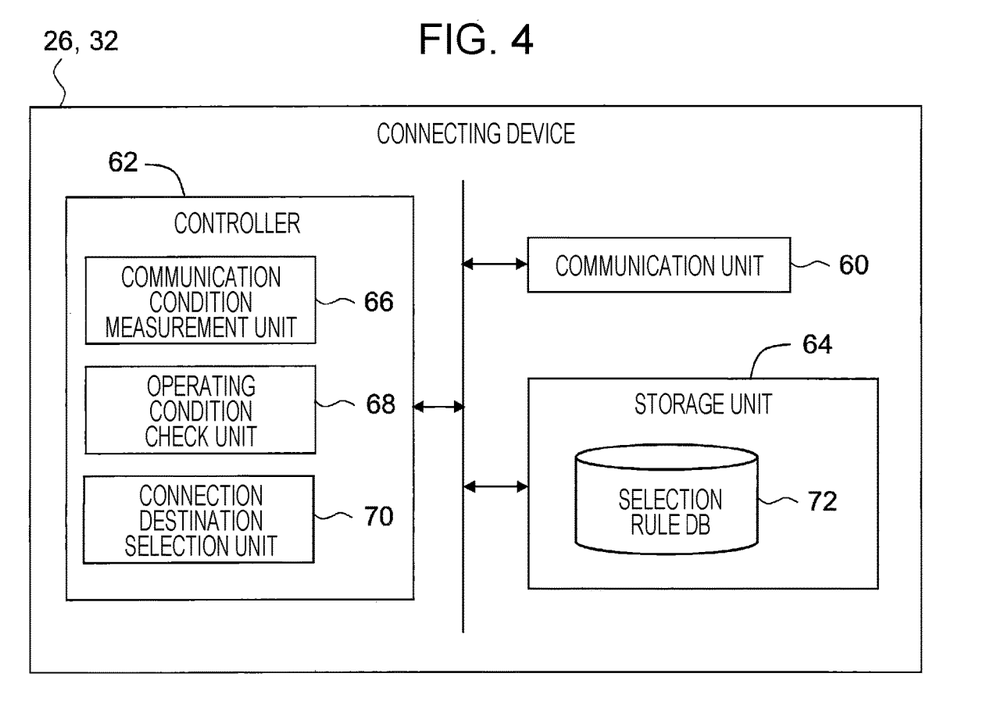
FIG. 4 is a block diagram of a connecting device depicted in FIG. 1.

FIG. 4 is a block diagram of the connecting device 26 depicted in FIG. 1. The connecting device 26 on the premises has a configuration including a communication unit 60, a controller 62, and a storage unit 64. The connecting device 32 in the cloud also has the same basic configuration as is depicted in FIG. 4.

The communication unit 60 is a communication interface that has a configuration similar to the configuration of the server-side communication unit 40 depicted in FIG. 2. This communication interface enables the connecting devices 26 and 32 to receive a connection request from the external terminal 16 or the internal terminal 24.

The controller 62 has a configuration with a processor including a CPU or a microprocessing unit (MPU). The controller 62 reads and executes a data management program stored in the storage unit 64 and functions as a communication condition measurement unit 66, an operating condition check unit 68, and a connection destination selection unit 70.

The storage unit 64 is formed by a non-transitory computer readable storage medium. In the example depicted in FIG. 4, a database regarding rules for selecting a connection destination (referred to as a "selection rule DB 72" below) is constructed in the storage unit 64.

Figure 5:
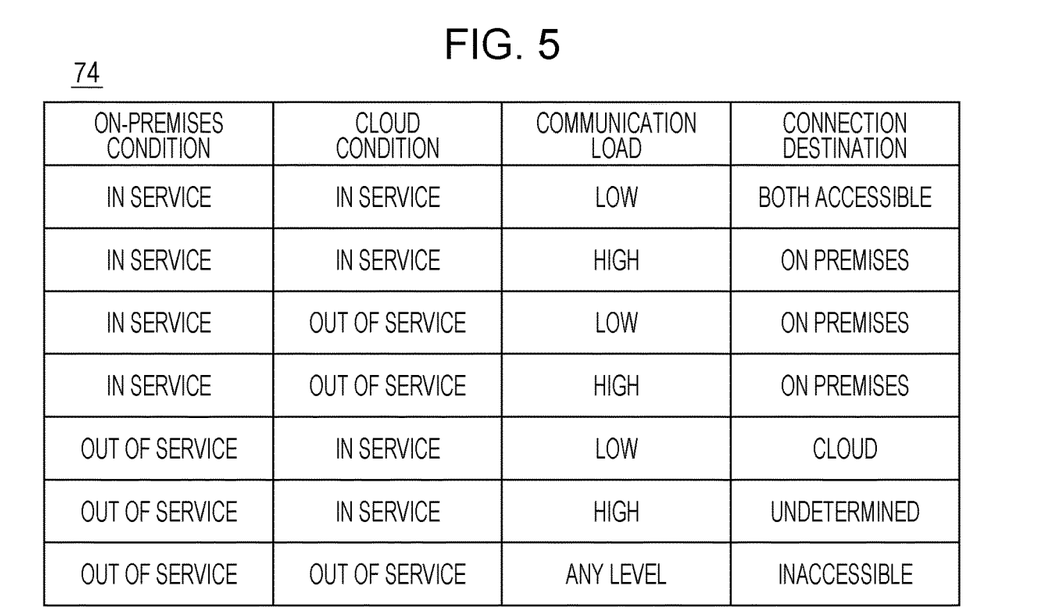
FIG. 5 is an illustration depicting an example data structure provided by a basic rule table included in a selection rule DB depicted in FIG. 4.

FIG. 5 is an illustration depicting an example data structure provided by a basic rule table 74 included in the selection rule DB 72 depicted in FIG. 4. The basic rule table 74 provides information representing a relationship between the following items: "on-premises condition", "cloud condition", "communication load", and "connection destination". The item "on-premises condition" represents an operating condition of the on-premises server 20. The item "cloud condition" represents an operating condition of the cloud server 30. The item "communication load" indicates the amount of communication load carried by the proxy server 22. The item "connection destination" represents a connection destination for a client terminal.

Specifically, for the connection destination, one of the following five items is selected: (1) "on premises", which indicates that only the on-premises server 20 is accessible, (2) "cloud", which indicates that only the cloud server 30 is accessible, (3) "both accessible", which indicates that both the on-premises server 20 and the cloud server 30 are accessible, (4) "inaccessible", which indicates that neither of the on-premises server 20 and the cloud server 30 is accessible, and (5) "undetermined", which indicates that the connection destination is not determined yet.

Operation of Data Management System 10

The data management system 10 according to the present exemplary embodiment is configured as above. Next, various operations of the data management system 10 will be described with reference to mainly flowcharts depicted in FIGS. 6 and 7.

First Operation: Synchronous Update of Data

First, a "synchronous update of data", which is a first operation of the data management system 10, will be described with reference to the flowchart in FIG. 6. The synchronous update is achieved by simultaneously performing the following processes: (1) an update process in which a data update in the on-premises environment 12 is incorporated into the cloud environment 14 and (2) an update process in which a data update in the cloud environment 14 is incorporated into the on-premises environment 12. The first update process will only be described herein. Steps S1 to S4 in FIG. 6 are performed by the on-premises server 20, and step S5 is performed by the cloud server 30.

Figure 6:
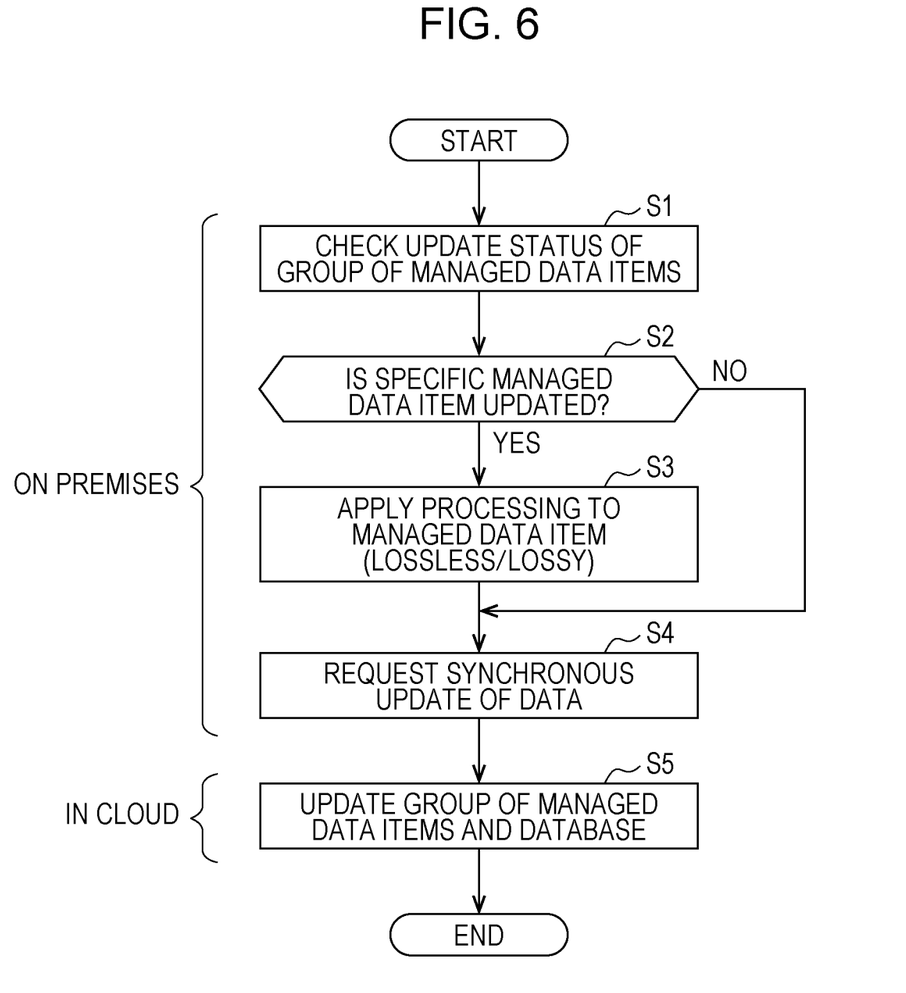
FIG. 6 is a flowchart depicting an operation of the data management system, which performs a synchronous update of data.

In step S1 in FIG. 6, the server-side controller 42 in the on-premises server 20 (more precisely, the data management unit 46) checks update status of the group of managed data items 52. Specifically, the data management unit 46 compares the first management table 56 at the time of the latest update with the first management table 56 at the time of the preceding update and then checks whether the group of managed data items 52 has been updated and what the update is.

In step S2, the data management unit 46 on the premises references the check result obtained in step S1, and checks whether a specific managed data item has undergone an update (specifically, an addition or a modification). Examples of a specific managed data item include a data item that requires predetermined processing. If no specific managed data item has undergone an update (NO in step S2), the process skips step S3 and proceeds to step S4 described below. In contrast, if a specific managed data item has undergone an update (YES in step S2), the process proceeds to step S3 that follows.

In step S3, the data processing unit 50 on the premises applies desired processing to the specific managed data item. This processing is lossless or lossy data processing with data manageability in the cloud environment 14 taken into account. Examples of the processing include (1) compression, which reduces the size of a data item, (2) trimming, which clips a portion of an image, (3) resolution conversion, which changes the resolution of an image, (4) gradation conversion, which changes the gradation characteristics or the number of channels of an image, and (5) data conversion, which changes the data type of a data item.

In step S4, the data management unit 46 on the premises requests the cloud server 30 to perform a synchronous update of data. Specifically, the on-premises server 20 transmits to the cloud server 30 a piece of data in which a managed data item to be updated and the first management table 56 are included. It should be noted that when step S3 is performed, a data item that has undergone processing (also referred to as a "processed data item" below) is transmitted instead of the original data item (also referred to as an "unprocessed data item" below).

In step S5, the server-side controller 42 in the cloud (more precisely, the data management unit 46) updates various databases in response to the request to perform a synchronous update received in step S4. Specifically, the data management unit 46 in the cloud uses the managed data item received from the on-premises server 20 and updates the group of managed data items 52. The data management unit 46 in the cloud also uses the first management table 56 received from the on-premises server 20 and updates the management information DB 54.

In this way, the first operation of the data management system 10 is complete. The on-premises server 20 and the cloud server 30 sequentially repeat the operation illustrated in the flowchart in FIG. 6 and perform synchronization control to maintain the consistency between the data items retained by the on-premises server 20 and the data items retained by the cloud server 30. The phrase "maintaining the consistency" means not only sharing completely identical data items but also sharing substantially identical data items or retaining two sets of data items whose contents correspond to each other. An example of retaining "two sets of data items whose contents correspond to each other" is the case where the on-premises server 20 retains an unprocessed data item and the cloud server 30 retains a processed data item.

Second Operation: Connection to Internal Terminal 24

Next, "connection to the internal terminal 24", which is a second operation of the data management system 10, will be described with reference to the flowchart in FIG. 7. Steps S11 to S16 and step S18 are performed by the connecting device 26, and step S17 is performed by a server at a connection destination (namely one of the on-premises server 20 and the cloud server 30).

Figure 7:
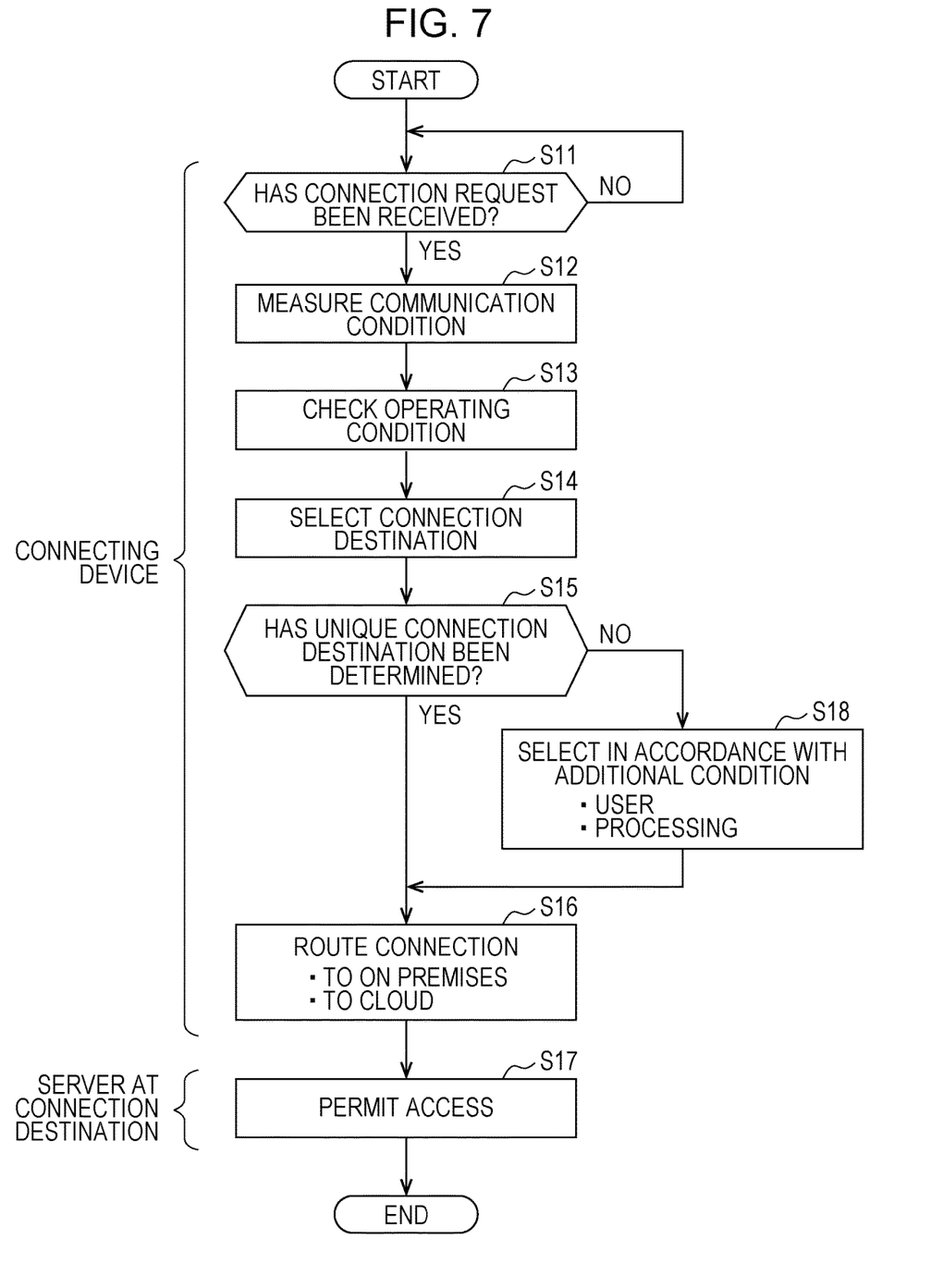
FIG. 7 is a flowchart depicting an operation of the data management system, which selects a connection destination.

In step S11 in FIG. 7, the connecting device 26 on the premises checks whether a connection request to connect to a server has been received from the internal terminal 24 located in the on-premises environment 12. Before the check, a user uses the user interface of the internal terminal 24 to perform a request operation including user authentication and specification of a managed data item. In response to the user operation, the internal terminal 24 generates a request signal including connection request information, such as a username, an email address, a password, and a filename, and transmits the request signal to the connecting device 26.

If the connecting device 26 has not received the connection request from the internal terminal 24 (NO in step S11), the process remains in step S11 until the connection request is received. In contrast, if the connecting device 26 receives the connection request (YES in step S11), the process proceeds to step S12 that follows.

In step S12, the controller 62 (more precisely, the communication condition measurement unit 66) measures a condition of communication between the on-premises server 20 and the cloud server 30 at the time that the connection request is received in step S11. Specifically, the communication condition measurement unit 66 analyzes a communication log that represents the communication history of the proxy server 22 and calculates an indicator to indicate a communication load during the current time period. The indicator can be calculated by using, for example, the amount of communication data, the frequency of communication, or a combination of such data items.

In step S13, the controller 62 (more precisely, the operating condition check unit 68) checks the operating condition of the on-premises server 20 at the time that the connection request is received in step S11. Specifically, the operating condition check unit 68 transmits a test signal to the on-premises server 20, detects whether a response signal is received, and determines whether the on-premises server 20 is in service or out of service. In addition, the operating condition check unit 68 also checks the operating condition of the cloud server 30 by acquiring a check result obtained by the connecting device 32 in the cloud.

In step S14, the controller 62 (more precisely, the connection destination selection unit 70) uses the communication condition measured in step S12 and the operating conditions checked in step S13 to select a connection destination for the internal terminal 24 that has transmitted the connection request. Specifically, the connection destination selection unit 70 selects one of the on-premises server 20 and the cloud server 30 in accordance with a combination of a plurality of conditions regarding the communication condition or the operating conditions.

In FIG. 5, three conditions are illustrated: a first condition regarding whether the on-premises server 20 is "in service" or "out of service", a second condition regarding whether the cloud server 30 is "in service" or "out of service", and a third condition regarding whether the indicator indicating the communication load is equal to the threshold or less ("low") or equal to the threshold or more ("high"). The numbers of individual conditions and combinations are not limited to this example.

For example, after reading the basic rule table 74 included in the selection rule DB 72, the connection destination selection unit 70 selects a connection destination in accordance with a combination of three items "on-premises condition", "cloud condition", and "communication load". In the example in FIG. 5, if the on-premises server 20 and the cloud server 30 are both in service and the communication load of the proxy server 22 is high, the on-premises server 20 is selected.

In step S15, the connection destination selection unit 70 checks whether a unique connection destination for the internal terminal 24 is determined by the selection in step S14. If a unique connection destination is not determined (NO in step S15), the process proceeds to step S18 described below. In contrast, if a unique connection destination is determined (YES in step S15), the process proceeds to step S16 that follows.

In step S16, the controller 62 in the connecting device 26 directs the internal terminal 24 to the connection destination specified in step S14. In addition to the direction, the connecting device 26 transmits the connection request information acquired in step S11 to the connection destination.

In step S17, the server-side controller 42 at the connection destination (more precisely, the access management unit 48) checks the above connection request information against the first management table 56 and the second management table 58 and permits the connection to the internal terminal 24 if it is confirmed that the user has an access right. This procedure enables the internal terminal 24 to access the managed data item that is required.

Selection of Connection Destination by Using Additional Condition

If the basic rule table 74 that specifies one connection destination ("on premises" or "cloud") for each combination of the plurality of conditions is used, a unique connection destination for the internal terminal 24 is determined in accordance with the basic rule table 74. However, if the basic rule table 74 does not cover possible combinations completely or includes one of "both accessible", "inaccessible", and "undetermined" as a connection destination, the connection destination selection unit 70 cannot determine a unique connection destination for the internal terminal 24 in accordance with the basic rule table 74.

Thus, in step S18 in FIG. 7, if a combination of the plurality of conditions does not enable the connection destination selection unit 70 to select a connection destination, the connection destination selection unit 70 selects a connection destination for the internal terminal 24 in accordance with an additional condition. Specific examples of the "additional condition" will be described below in detail with reference to FIGS. 8 to 10.

First Example: User-Related Condition

A user sometimes wants to access a managed data item either on the premises or in the cloud for a job-related reason. Thus, a condition regarding a user of the internal terminal 24 or the membership of the user may be added.

Figure 8:
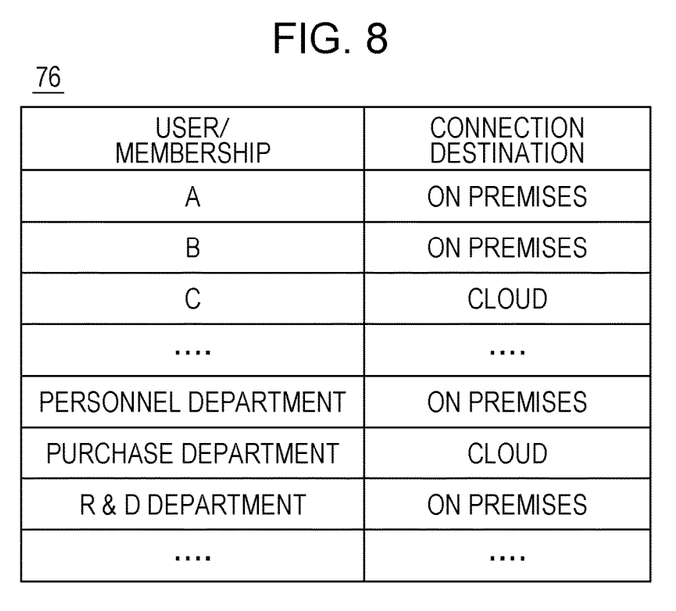
FIG. 8 is an illustration depicting an example data structure provided by an additional rule table of a first type included in the selection rule DB depicted in FIG. 4.

FIG. 8 is an illustration depicting an example data structure provided by an additional rule table 76 of a first type included in the selection rule DB 72 depicted in FIG. 4. The additional rule table 76 provides information representing a relationship between the following items: "user/membership", which represents a user or the group to which the user belongs, and "connection destination", which represents a connection destination for a client terminal. Examples of the "membership" include a division, a section, a team, a project, and an organization, such as an enterprise or an association.

For example, while "on premises" is selected as the connection destination for the users A and B, who mostly work in the on-premises environment 12, "cloud" is selected as the connection destination for the user C, who mostly works outside the on-premises environment 12. Further, while "on premises" is selected as the connection destination for a department that handles managed data items requiring a relatively high degree of confidentiality (for example, a personnel department and a research and development department), "cloud" is selected as the connection destination for a department that handles managed data items requiring a relatively low degree of confidentiality (for example, a purchase department).

Second Example: Data-Related Condition

Depending on intended use of a managed data item, while the goal of using the managed data item can be achieved in some cases by using a processed data item, the goal cannot be achieved in other cases by using a processed data item. Thus, a condition regarding a data type, intended use of a data item, or a type of processing may be added.

For example, if processing that irreversibly degrades the image quality of an image, such as lossy compression, gradation conversion, or image reduction, is performed on an image data item, while the connection destination selection unit 70 selects the on-premises server 20 if the degree of degradation of the image quality due to the processing exceeds the threshold, the connection destination selection unit 70 may select the cloud server 30 if the degree of degradation of the image quality is equal to the threshold or less. This selection is made based on an additional rule table 78 depicted in FIG. 9.

Figure 9:
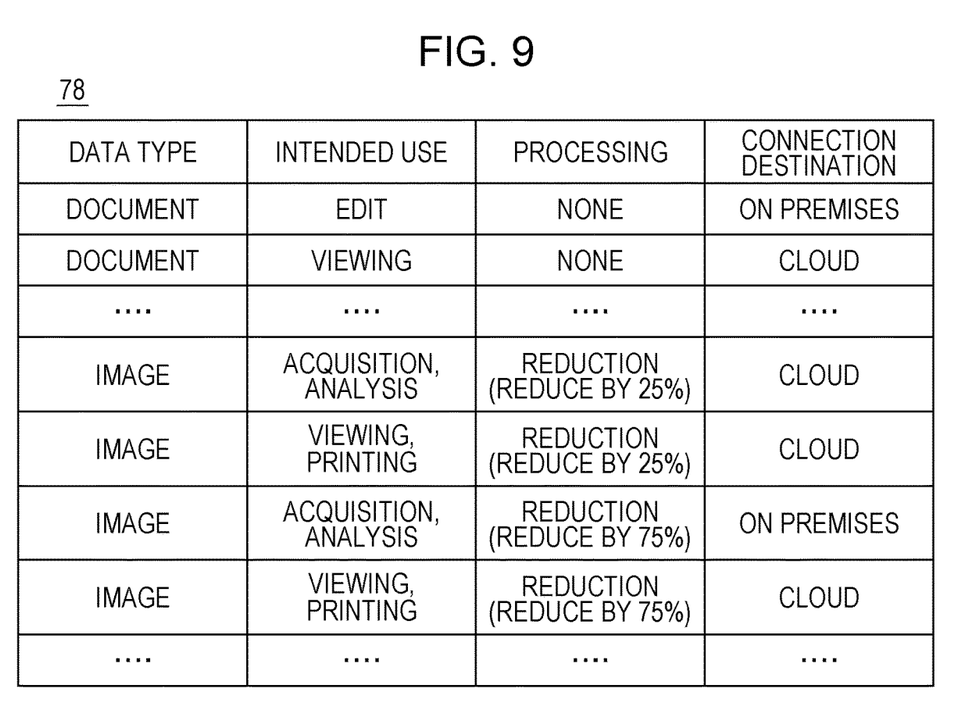
FIG. 9 is an illustration depicting an example data structure provided by an additional rule table of a second type included in the selection rule DB depicted in FIG. 4.

FIG. 9 is an illustration depicting an example data structure provided by the additional rule table 78 of a second type included in the selection rule DB 72 depicted in FIG. 4. The additional rule table 78 provides information representing a relationship between the following items: "data type", which represents the type of a managed data item, "intended use", which represents intended use of the managed data item, "processing", which represents the type of processing, and "connection destination", which represents a connection destination for a client terminal.

As can be seen from FIG. 9, while "on premises" is selected as the connection destination if the intended use is editing a document data item, "cloud" is selected as the connection destination if the intended use is viewing a document data item. Further, if the intended use is acquiring or analyzing an image data item, irrespective of whether the image magnification is changed, "on premises" is selected as the connection destination where the image data item before undergoing image reduction is available for access. In contrast, if the intended use is viewing or printing an image data item, one of "on premises" and "cloud" is selected as the connection destination, depending on whether the amount of change in the image magnification is larger or smaller than the threshold (for example, 50%).

Third Example: Decompression-Location-Related Condition

When a cloud service provided by a platform operator is used, a usage-based charge is sometimes incurred. Thus, an original data item is sometimes retained in a compressed form in the cloud server 30 to reduce the usage fee as much as possible. Before the compressed data item is used, a decompression process is performed in advance to restore the original data item. However, as the data size increases, the decompression process tends to be time-consuming, and the system responsiveness may degrade correspondingly. Thus, a condition regarding a communication load and a data size may be added.

For example, if processing that reversibly compresses a data item (so-called lossless compression) is performed, while the connection destination selection unit 70 selects the on-premises server 20 if the data size before the processing or after the processing exceeds the threshold, the connection destination selection unit 70 may select the cloud server 30 if the data size is equal to the threshold or smaller. This selection is made based on an additional rule table 80 depicted in FIG. 10.

Figure 10:
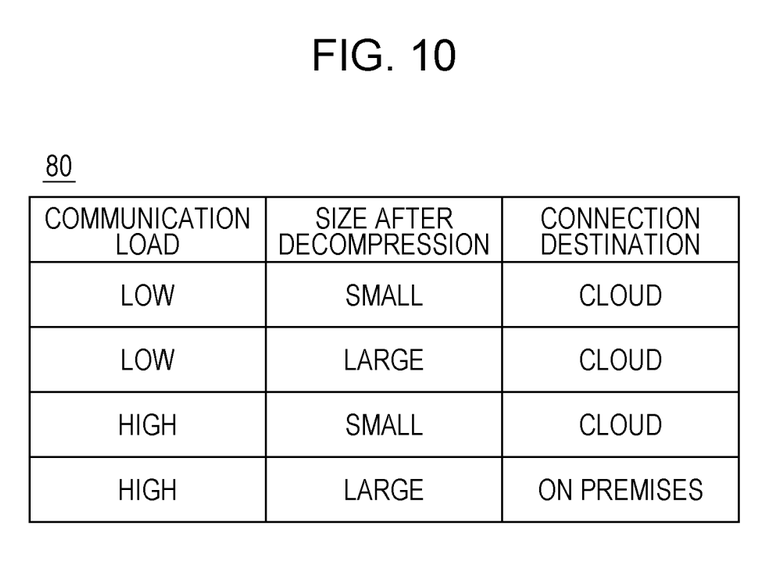
FIG. 10 is an illustration depicting an example data structure provided by an additional rule table of a third type included in the selection rule DB depicted in FIG. 4.

FIG. 10 is an illustration depicting an example data structure provided by the additional rule table 80 of a third type included in the selection rule DB 72 depicted in FIG. 4. The additional rule table 80 provides information representing a relationship between the following items: "communication load", which indicates the amount of communication load carried by the proxy server 22, "size after decompression", which indicates the size of a data item after decompression, and "connection destination", which represents a connection destination for a client terminal.

As can be seen from FIG. 10, if the communication load is low, irrespective of the size of a data item after decompression, "cloud" is selected, and the decompression process of the data item is performed by the cloud server 30. In contrast, if the communication load is high, one of "cloud" and "on premises" is selected as the connection destination, depending on whether the data size is larger or smaller than the threshold (for example, 5 megabyte (MB)).

Summarization of Exemplary Embodiment

As described above, the data management system 10 includes the on-premises server 20 (the first apparatus), the cloud server 30 (the second apparatus), and the connecting devices 26 and 32. The on-premises server 20 is installed inside the intranet 18 (the network) and is subjected to a restriction on connection from outside the intranet 18. The cloud server 30 is installed outside the intranet 18 and is capable of connecting to the on-premises server 20 and to the external terminal 16. The connecting devices 26 and 32 are integrated with or separated from the on-premises server 20 and the cloud server 30, respectively.

The on-premises server 20 and the cloud server 30 perform synchronization control to maintain consistency between data retained by the on-premises server 20 and data retained by the cloud server 30. In response to a connection request from the internal terminal 24, the connecting devices 26 and 32 select one of the on-premises server 20 and the cloud server 30 as the connection destination for the internal terminal 24 in accordance with a communication condition between the on-premises server 20 and the cloud server 30 and operating conditions of the on-premises server 20 and the cloud server 30.

In this way, a connection destination suitable for the communication condition and the operating conditions can be determined because one of the on-premises server 20 and the cloud server 30 is selected as the connection destination for the internal terminal 24 in response to the connection request from the internal terminal 24 in accordance with the communication condition and the operating conditions as described above. Thus, when an operation is performed in accordance with a basic policy in which the internal terminal 24 is connected to the on-premises server 20 and the external terminal 16 is connected to the cloud server 30, an operation is possible, which is more adaptable to a circumstance than the operation in which the connection destination for the internal terminal 24 is fixed at the on-premises server 20.

Modifications

The present disclosure is not limited to the exemplary embodiment described above, and various modifications are obviously possible as long as they do not depart from the scope of the present disclosure. Alternatively, various configurations may freely be combined as long as no technical inconsistency arises.

In the embodiment above, the term "processor" refers to hardware in a broad sense. Examples of the processor include general processors (e.g., CPU or MPU), dedicated processors (e.g., GPU, ASIC: Application Specific Integrated Circuit, FPGA: Field Programmable Gate Array, and PLD: Programmable Logic Device).

In the embodiment above, the term "processor" is broad enough to encompass one processor or plural processors in collaboration which are located physically apart from each other but may work cooperatively. The order of operations of the processor is not limited to one described in the flowcharts depicted in FIGS. 6 and 7, and may be changed as necessary.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A data management system comprising:
a first apparatus that is installed inside a network and that is subjected to a restriction on connection from outside the network;
a second apparatus that is installed outside the network and that is capable of connecting to the first apparatus and to a terminal outside the network; and
a connecting device that is integrated with or separated from the first apparatus,
the first apparatus and the second apparatus performing synchronization control to maintain consistency between data retained by the first apparatus and data retained by the second apparatus,
in response to a connection request from a terminal inside the network, the connecting device selecting one of the first apparatus and the second apparatus as a connection destination for the terminal inside the network in accordance with a communication condition between the first apparatus and the second apparatus and operating conditions of the first apparatus and the second apparatus.

2. The data management system according to claim 1, wherein the connecting device selects one of the first apparatus and the second apparatus in accordance with a combination of a plurality of conditions regarding the communication condition or the operating conditions.

3. The data management system according to claim 2, wherein the connecting device selects one of the first apparatus and the second apparatus in accordance with an additional condition if the combination of the plurality of conditions does not enable the connecting device to select the connection destination.

4. The data management system according to claim 3, wherein the additional condition includes a condition regarding a user of the terminal inside the network or a group to which the user belongs.

5. The data management system according to claim 3, wherein the first apparatus and the second apparatus perform synchronization control to maintain consistency between unprocessed data and processed data regarding an image that undergoes lossy processing to degrade an image quality, the unprocessed data being retained by the first apparatus, the processed data being retained by the second apparatus,
the additional condition includes a condition regarding extent to which the image quality is degraded by the lossy processing, and
the connecting device selects the first apparatus if the extent to which the image quality is degraded is more than a threshold and selects the second apparatus if the extent to which the image quality is degraded is equal to the threshold or less.

6. The data management system according to claim 3, wherein the first apparatus and the second apparatus perform synchronization control to maintain consistency between unprocessed data and processed data regarding data that undergoes processing of lossless compression, the unprocessed data being retained by the first apparatus, the processed data being retained by the second apparatus,
the additional condition includes a condition regarding a size of data before the processing or after the processing, and
the connecting device selects the first apparatus if the size is greater than a threshold and selects the second apparatus if the size is equal to the threshold or smaller.

7. A non-transitory computer readable medium storing a program causing a computer to execute a process for data management, the process being applied to a system including
a first apparatus that is installed inside a network and that is subjected to a restriction on connection from outside the network,
a second apparatus that is installed outside the network and that is capable of connecting to the first apparatus and to a terminal outside the network, and
a connecting device that is integrated with or separated from the first apparatus,
the process comprising:
causing the first apparatus and the second apparatus to perform synchronization control to maintain consistency between data retained by the first apparatus and data retained by the second apparatus; and
causing the connecting device, in response to a connection request from a terminal inside the network, to select one of the first apparatus and the second apparatus as a connection destination for the terminal inside the network in accordance with a communication condition between the first apparatus and the second apparatus and operating conditions of the first apparatus and the second apparatus.

8. A data management system that includes
a first apparatus that is installed inside a network and that is subjected to a restriction on connection from outside the network, a second apparatus that is installed outside the network and that is capable of connecting to the first apparatus and to a terminal outside the network, and a connecting device that is integrated with or separated from the first apparatus, the data management system comprising:

means for causing the first apparatus and the second apparatus to perform synchronization control to maintain consistency between data retained by the first apparatus and data retained by the second apparatus; and means for causing the connecting device, in response to a connection request from a terminal inside the network, to select one of the first apparatus and the second apparatus as a connection destination for the terminal inside the network in accordance with a communication condition between the first apparatus and the second apparatus and operating conditions of the first apparatus and the second apparatus.

* * * * *